(12) United States Patent
Bortnikov et al.

(10) Patent No.: US 10,083,217 B2
(45) Date of Patent: Sep. 25, 2018

(54) METHOD AND SYSTEM FOR UPGRADING A SET OF REPLICATED STATE MACHINE PROCESSES

(71) Applicant: International Business Machines Corporation, Armonk, NY (US)

(72) Inventors: Vita Bortnikov, Haifa (IL); Zvi Cahana, Haifa (IL); Shlomit Ifergan-Shachor, Yokneam Eilit (IL); Ilya Shnayderman, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 14/952,944

(22) Filed: Nov. 26, 2015

(65) Prior Publication Data

US 2017/0153881 A1    Jun. 1, 2017

(51) Int. Cl.
*G06F 9/45* (2006.01)
*G06F 17/30* (2006.01)
*G06F 8/656* (2018.01)
*G06F 9/445* (2018.01)

(52) U.S. Cl.
CPC ........ *G06F 17/30575* (2013.01); *G06F 8/656* (2018.02); *G06F 9/44505* (2013.01)

(58) Field of Classification Search
CPC ... G06F 8/65; G06F 17/30575; G06F 9/44505
See application file for complete search history.

(56) References Cited

U.S. PATENT DOCUMENTS

| | | | |
|---|---|---|---|
| 6,981,277 B1* | 12/2005 | Smith | G06F 8/656 726/2 |
| 7,099,333 B2* | 8/2006 | Baker | H04L 29/06 370/395.5 |
| 8,135,987 B2 | 3/2012 | Douceur et al. | |
| 8,261,295 B1* | 9/2012 | Risbood | G06F 9/4433 719/328 |
| 8,719,225 B1* | 5/2014 | Rath | G06F 17/30575 707/634 |
| 8,799,422 B1 | 8/2014 | Qu et al. | |

(Continued)

OTHER PUBLICATIONS

Leslie Lamport et al., "Reconfiguring a State Machine", [Online], 2010, pp. 1-14, [Retrieved from Internet on Aug. 14, 2017], <http://lamport.azurewebsites.net/pubs/reconfiguration-tutorial.pdf>.*

(Continued)

*Primary Examiner* — Ziaul A Chowdhury (57) ABSTRACT

A computer-implemented method, computerized apparatus and computer program product, the method comprising: receiving a proposed reconfiguration command, the proposed reconfiguration command indicating a modification of a protocol version employed by a plurality of replica-set processes to an updated protocol version; tentatively agreeing on at least one proposed command following the proposed reconfiguration command, the at least one proposed command being in accordance with the updated protocol version, wherein said tentatively agreeing is decided prior to agreeing on the reconfiguration command; and, responsive to agreeing on the reconfiguration command, committing the tentatively agreed at least one proposed command.

18 Claims, 3 Drawing Sheets

(56) References Cited

U.S. PATENT DOCUMENTS

| | | | | |
|---|---|---|---|---|
| 8,943,178 | B2 | 1/2015 | Bortnikov et al. | |
| 2004/0044998 | A1* | 3/2004 | Wildhagen | G06F 8/656 |
| | | | | 717/170 |
| 2004/0083476 | A1* | 4/2004 | Zhou | G06F 8/656 |
| | | | | 718/102 |
| 2005/0198106 | A1* | 9/2005 | Lamport | G06F 11/182 |
| | | | | 709/201 |
| 2006/0136781 | A1* | 6/2006 | Lamport | G06F 11/1482 |
| | | | | 714/25 |
| 2006/0155781 | A1* | 7/2006 | MacCormick | G06F 17/30575 |
| 2006/0168011 | A1* | 7/2006 | Lamport | G06F 11/1494 |
| | | | | 709/206 |
| 2006/0206758 | A1* | 9/2006 | Butterworth | G06F 9/46 |
| | | | | 714/11 |
| 2010/0106813 | A1* | 4/2010 | Voutilainen | G06F 9/5061 |
| | | | | 709/221 |
| 2011/0153791 | A1* | 6/2011 | Jones | G06F 9/44505 |
| | | | | 709/221 |
| 2012/0011398 | A1* | 1/2012 | Eckhardt | G06F 11/2028 |
| | | | | 714/15 |
| 2012/0287902 | A1* | 11/2012 | Bufe | H04W 36/0055 |
| | | | | 370/331 |
| 2014/0074996 | A1* | 3/2014 | Bortnikov | H04L 41/0816 |
| | | | | 709/221 |

OTHER PUBLICATIONS

Leander Jehl et al., "Asynchronous Recon_guration for Paxos State Machines", [Online], 2014, pp. 1-15, [Retrieved from Interent on Aug. 14, 2017], <https://pdfs.semanticscholar.org/fbb4/1610b1a5b007a95a0b970a7e475c313931b5.pdf>.*

Fred B. Schneider et al., "Implementing Trustworthy Services using Replicated State Machines", [Online], 2005, pp. 1-23, [Retrieved from Internet on May 14, 2018], <https://pdfs.semanticscholar.org/f6b0/6f59619d6321639584b7e55cbca8bd6b7013.pdf>.*

Roy Friedman et al., "Fast Replicated State Machines Over Partitionable Networks", [Online], 1997, pp. 130-137, [Retrieved from Internet on May 14, 2018], <https://ieeexplore.ieee.org/stamp/stamp.jsp?tp=&arnumber=632808>.*

Leslie Lamport et al., "Vertical Paxos and Primary-Backup Replication", [Online], 2009, pp. 1-14, [Retrieved from Internet on May 14, 2018], <http://citeseerx.ist.psu.edu/viewdoc/download?doi=10.1.1.539.2996&rep=rep1&type=pdf>.*

Paweł T. Wojciechowski et al., "Model-Driven Comparison of State-Machine-based and Deferred-Update Replication Schemes", [Online], 2012, pp. 1-25, [Retrieved from Interent on May 14, 2018], <http://www.cs.put.poznan.pl/pawelw/pub/TR-05-12.pdf>.*

Balaji Arun et al., "Speculative Client Execution in Deferred Update Replication", Proceeding MW4NG '14 Proceedings of the 9th Workshop on Middleware for Next Generation Internet Computing, Article No. 5 , 2014.

Parisa Jalili Marandi et al., "High Performance State-Machine Replication", Dependable Systems & Networks (DSN), 2011 IEEE/IFIP 41st International Conference on Date of Conference: Jun. 27-30, 2011, pp. 454-465, Publisher: IEEE.

Disclosed Anonymously., "Minimal Downtime Database System for Major Software Version Upgrade in a Physical Log Replication Environment", ip.com, 2012.

Leslie Lamport., "The Part-Time Parliament", This article appeared in ACM Transactions on Computer Systems 16, 2 (May 1998), 133-169. Minor corrections were made on Aug. 29, 2000.

* cited by examiner

METHOD AND SYSTEM FOR UPGRADING A SET OF REPLICATED STATE MACHINE PROCESSES

TECHNICAL FIELD

The present disclosure relates to upgrading a set of replicated state machine processes.

BACKGROUND

Replicated State Machine (RSM) is a general method for providing high availability and fault-tolerant services, e.g. software services. In this method, the state machine of the service is replicated and maintained across multiple processes, also referred to as the replica-set, and updated via a sequence of commands which are fed to each of the processes in a globally consistent order. By processing the commands in the same order and in a deterministic fashion, the state of each of the processes in the replica-set can progress in a synchronized and consistent manner.

On occasion, an upgrade of the RSM, such as for introducing an updated version of the RSM implementation or of the service provided thereby, may be required to take place. For example, a bug in the software running the RSM may be fixed, and the bug-free version may need to be deployed among the replica-set processes. Often, a new functionality may be added, in the form of new commands, communication protocols, behavior, or the like, which might not be understood by processes operating under previous versions.

BRIEF SUMMARY

One exemplary embodiment of the disclosed subject matter is a computer-implemented method comprising: receiving a proposed reconfiguration command, the proposed reconfiguration command indicating a modification of a protocol version employed by a plurality of replica-set processes to an updated protocol version; tentatively agreeing on at least one proposed command following the proposed reconfiguration command, the at least one proposed command being in accordance with the updated protocol version, wherein said tentatively agreeing is decided prior to agreeing on the reconfiguration command; and, responsive to agreeing on the reconfiguration command, committing the tentatively agreed at least one proposed command.

Another exemplary embodiment of the disclosed subject matter is a computerized apparatus having a processor, the processor being adapted to perform the steps of: receiving a proposed reconfiguration command, the proposed reconfiguration command indicating a modification of a protocol version employed by a plurality of replica-set processes to an updated protocol version; tentatively agreeing on at least one proposed command following the proposed reconfiguration command, the at least one proposed command being in accordance with the updated protocol version, wherein said tentatively agreeing is decided prior to agreeing on the reconfiguration command; and, responsive to agreeing on the reconfiguration command, committing the tentatively agreed at least one proposed command.

Yet another exemplary embodiment of the disclosed subject matter is a computer program product comprising a computer readable storage medium retaining program instructions, which program instructions when read by a processor, cause the processor to perform a method comprising: receiving a proposed reconfiguration command, the proposed reconfiguration command indicating a modification of a protocol version employed by a plurality of replica-set processes to an updated protocol version; tentatively agreeing on at least one proposed command following the proposed reconfiguration command, the at least one proposed command being in accordance with the updated protocol version, wherein said tentatively agreeing is decided prior to agreeing on the reconfiguration command; and, responsive to agreeing on the reconfiguration command, committing the tentatively agreed at least one proposed command.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to provide an automated mechanism for upgrading a plurality of replica-set processes. Another technical problem dealt with by the disclosed subject matter is to obviate a requirement for the upgrading procedure to be completed at all replica-set processes prior to exposing new functionality by any of them. Yet another technical problem dealt with by the disclosed subject matter is to alleviate likelihood of divergence in the state of upgraded and non-upgraded processes, also known as "split brain" phenomenon, due to individual processes exposing new functionality as soon as they are upgraded.

One technical solution is to expose new functionality before the upgrade procedure is completed in a speculative manner. A reconfiguration command employing an upgraded protocol version for the operation of the replica-set processes may be proposed, similarly as any other RSM command. Until being agreed, this protocol version may be regarded as speculative, as well as any subsequent RSM commands in accordance thereto. Once agreed, the speculative protocol version may be committed, together with the RSM commands agreed based thereupon, thus deployment of the upgraded protocol version is completed without interrupting execution or disconnecting non-upgraded processes.

In some exemplary embodiments, an implementation of a speculative state machine supporting dynamic reconfiguration during continuous execution, such as disclosed in: V. Bortnikov, G. Chockler, D. Perelman, A. Roytman, S. Shachor, and I. Shnayderman. FRAPPE': Fast Replication Platform for Elastic Services. In *ACM LADIS* (2011) (hereinafter FRAPPE), which is hereby incorporated by reference in its entirety without giving rise to disavowment, may be utilized with appropriate modifications. A replica-set configuration may be composed of the identities of the processes of the replica-set and dictate the eligible quorums to agree on RSM commands. A new configuration may be proposed as any other RSM command, and until agreed it may be regarded as speculative, thus creating a branch in the globally ordered log of commands. RSM commands may then be proposed against that configuration and branch, becoming speculative themselves. Once agreed by quorums of processes in both configurations, the current and proposed (e.g., if their set of replicas differs from one another), the respective speculative configuration may be committed, thus becoming the replica-set's current configuration, and its associated branch, including all RSM commands agreed against it, may be merged into the globally ordered log of commands. In some exemplary embodiments, the configuration may be augmented with the version identifier of the protocol understood by the replica-set processes. A reconfiguration command transitioning to a configuration employing an upgraded protocol may be proposed by any process of the current replica-set as soon as it is upgraded, without waiting for the rest of the replica-set processes to be upgraded as well. The condition for a speculative configuration to be committed and merged into the globally ordered log of commands may be altered to further require that the quorum of processes in the speculative configuration that acknowledged the reconfiguration command support a protocol version at least as high as the version indicated by that speculative configuration. Additionally or alternatively, processes may acknowledge a reconfiguration command upgrading the protocol only in case they support a protocol version at least as high as the version requested by the reconfiguration command. Based on such assumption, a quorum acknowledging the reconfiguration command may be a sufficient requirement as the additional requirement is inherently guaranteed.

One technical effect of utilizing the disclosed subject matter is to allow for continuous processing of RSM commands during an upgrade procedure, without having to wait until completion. Another technical effect of utilizing the disclosed subject matter is to support the exposing of a new functionality by an upgraded process as early as possible, e.g. immediately after being upgraded. Yet another technical effect of utilizing the disclosed subject matter is to avoid providing non-upgraded processes with commands that might not be understood by them.

In some exemplary embodiments, a replica-set configuration C may comprise a set of processes $C_R$ which together form the replica-set. Additionally or alternatively, C may comprise the version identifier of the protocol understood by the replica-set processes, herein denoted as $C_V$. Each process that proposes a new configuration C' may set $C'_V$ to be the version of the protocol that it currently supports. A process that starts with a supported protocol version V that is higher than the version of the current replica-set configuration $C_V$, may propose or use an existing speculative configuration C' with $C'_V = V$, and propose any subsequent RSM command against C'. Once a quorum of constituent processes of a speculative configuration complete the upgrade procedure, that speculative configuration, as well as any subsequent RSM command agreed in accordance thereto, may become eligible for being committed and merged into the globally ordered log of commands. In some exemplary embodiments, a speculative configuration may remain in speculative state until it is either agreed or another parallel speculative configuration is agreed. The parallel speculative configuration may be proposed by another process which does not acknowledge the speculative configuration, as an alternative thereto.

In some exemplary embodiments, a replica-set configuration C may be a tuple $(C_R, C_V)$, indicating both the set of processes $(C_R)$ and the version $(C_V)$.

In some exemplary embodiments, processes of the replica-set may exchange version messages with their peer processes, sending information about what protocol version they support, such as, for example, a version identifier of the software they run. Such version messages may be exchanged either by using a gossip protocol, as part of the handshake protocol between each two processes, or the like. The replica-set versions information may be maintained in a local data structure at each of the processes. The local data structure may be updated with each version message arriving from another process, and may be queried for ascertaining whether any, some or all of the replica-set processes support the same protocol version.

In some exemplary embodiments, the general procedure of upgrading the protocol version at the replica set may follow the method referred to as "rolling upgrade". For example, in case of a software upgrade, the following steps may be performed for each of the replica-set processes, one after the other: 1. stop the process; 2. upgrade the process' software; 3. restart the process; 4. wait for the process to synchronize its state with the replica-set.

In some exemplary embodiments, RSM commands may be agreed using a consensus algorithm such as Paxos. The Paxos algorithm allows a collection of processes that may propose values to agree on a single value chosen from among the plurality of proposed values. The algorithm contemplates three classes of roles performed by the processes in the collection: proposers, acceptors, and learners. A proposed value is sent by a proposer to a set of acceptors, each of which may accept the proposed value. Paxos requires that a value is chosen only if it was accepted by some majority of acceptors, referred to as "quorum". A learner learns that a value was chosen by finding out that a proposal has been accepted by a majority of acceptors. A leader process is chosen to play the role of distinguished proposer, being the only one to try issuing proposals, as well as the role of distinguished learner, being the only one acceptors respond to and responsible to inform other learners. The algorithm is depicted in L. Lamport. The part-time parliament. ACM Trans. Comput. Syst., 16(2):133-169, 1998.

In some exemplary embodiments, a RSM command may be agreed when the leader process sends a "commit" message for it. Similarly, a configuration may be agreed after being committed by the leader process.

In some exemplary embodiments, for a speculative configuration to be committed by the leader process, it may be required that a quorum of processes have already sent an acknowledgement message for the respective reconfiguration command.

In some exemplary embodiments, a reconfiguration command may comprise a set of processes $C'_R$ which may or may not be different than the set of processes $C_R$ of the current configuration. A condition for the leader process to send a "commit" message for the reconfiguration command may be that both a quorum of processes in $C_R$ and a quorum of processes in $C'_R$ have acknowledged that command.

In some exemplary embodiments, a condition for validating the reconfiguration command may additionally or alternatively provide that the leader process had received version messages from each quorum member of processes in $C'_R$ indicating that they support a protocol version at least as high as $C'_V$. In some exemplary embodiments, each time an acknowledgment message for a speculative configuration or a version message arrives at the leader process, a check may be performed as to whether any speculative configuration which satisfies the condition exists, and if so, the leader process may send a commit message for that speculative configuration, causing it to become agreed and validated. Accordingly, the branch associated with that speculative configuration, along with all RSM commands agreed against it, may be merged into the globally ordered log of commands.

In some exemplary embodiments, RSM commands agreed against a speculative configuration may be indicated as eligible for execution only after the speculative configuration has been agreed. Alternatively, these commands may be passed to execution by the acknowledging replica-set processes immediately after being agreed, and the processes' state following execution may be recorded as a speculative state, until the speculative configuration against which the commands were agreed upon is itself agreed and committed, by which the speculative state becomes the current state. Additionally or alternatively, a rollback may be performed to recover the state of the replica-set processes prior to applying the reconfiguration command. Additionally or alternatively, each replica-set may maintain a plurality of different states, each corresponding to a different configuration. In such an embodiment, all configurations are updated according to agreed upon commands and upon agreeing on a configuration (e.g., agreeing or rejecting a reconfiguration command), the relevant state is maintained and the irrelevant state is dropped. In some exemplary embodiments, there may be additional speculative branches that are still relevant (e.g., configuration C''' that may be agreed upon after configuration C' was agreed upon).

Figure 1A:
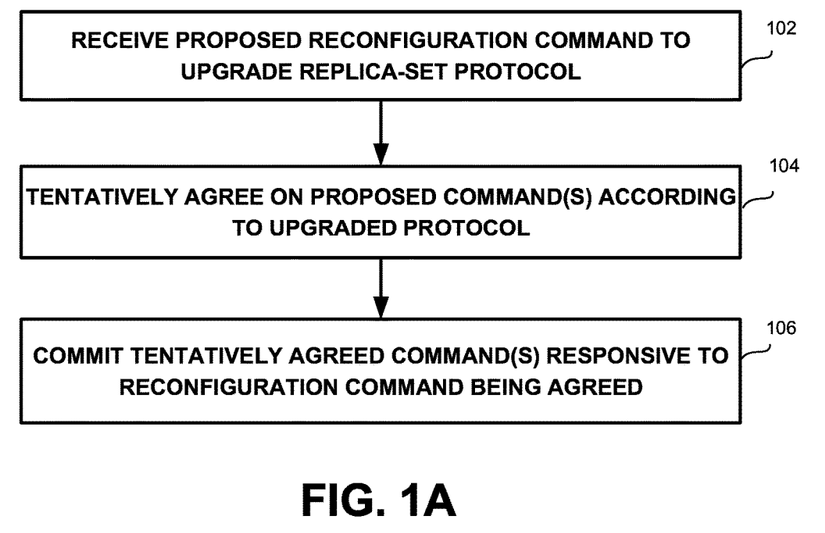
FIG. 1A shows a flowchart diagram of a method for upgrading a set of replicated state machine processes, in accordance with some exemplary embodiments of the subject matter.

Referring now to FIG. 1A showing a flowchart diagram of a method for upgrading a set of replicated state machine processes, in accordance with some exemplary embodiments of the subject matter.

On Step 102, a proposed reconfiguration command, indicating a modification of a protocol version employed by plurality of replica-set processes to an updated protocol version, may be received by a replicated state machine process. The reconfiguration command may be regarded as speculative as long as it has not been agreed. The reconfiguration command may be recorded in a branching command log, as described in FRAPPE. In some exemplary embodiments, the reconfiguration command may further indicate a modification of a current set of replica-set processes to a proposed set of replica-set processes.

On Step 104, at least one proposed command, being in accordance with the updated protocol version and following the reconfiguration command proposed on Step 102, may be tentatively agreed by the replica-set processes such as via a quorum thereof. The at least one proposed command may be proposed either by the same replica-set process that proposed the reconfiguration command or by any of the other replica-set processes. The tentative agreement may comprise acknowledgement of the at least one proposed command by at least a predetermined number of replica-set processes. The tentative agreement may be Paxos based. The at least one proposed command may comprise a sequence of one or more commands. In some exemplary embodiments, the at least one proposed command may be recorded in the branching command log in the corresponding speculative branch assigned for the reconfiguration command and RSM commands agreed in accordance thereto. Additionally or alternatively, the at least one proposed command may be passed to execution by the replica-set processes that acknowledged it and the state following execution may be recorded as speculative, pending the reconfiguration command being committed.

On Step 106, responsive to the reconfiguration command being agreed, the at least one proposed command tentatively agreed on Step 104 may be committed. The agreement on the reconfiguration command may comprise acknowledgement thereof by at least a predetermined number of replica-set processes. In some exemplary embodiments, processes acknowledging the proposed reconfiguration command may do so only if they support a protocol version at least as high as the protocol version of the proposed configuration (the updated protocol version). Alternatively, the condition for committing the reconfiguration command may include a sub-condition that the acknowledgements have been received from processes supporting the updated protocol version or higher versions. The agreement on the reconfiguration command may be Paxos based. In some exemplary embodiments, the agreement on the reconfiguration command may comprise acknowledgement thereof by both a quorum of replica-set processes in a current configuration and in a proposed configuration specified by the reconfiguration command. In some exemplary embodiments, committing the reconfiguration command may comprise indicating the at least one proposed command tentatively agreed in Step 104 as eligible for execution. In other exemplary embodiments, committing the reconfiguration command may comprise indicating a recorded speculative state following execution of the at least one proposed command as the current state. The reconfiguration command and at least one proposed command may be merged into the globally ordered log of commands. Any parallel speculative branches stemming from the branching point corresponding to the reconfiguration command, such as, for example, commands proposed against a previous protocol version prior to being updated, may be discarded.

Figure 1B:
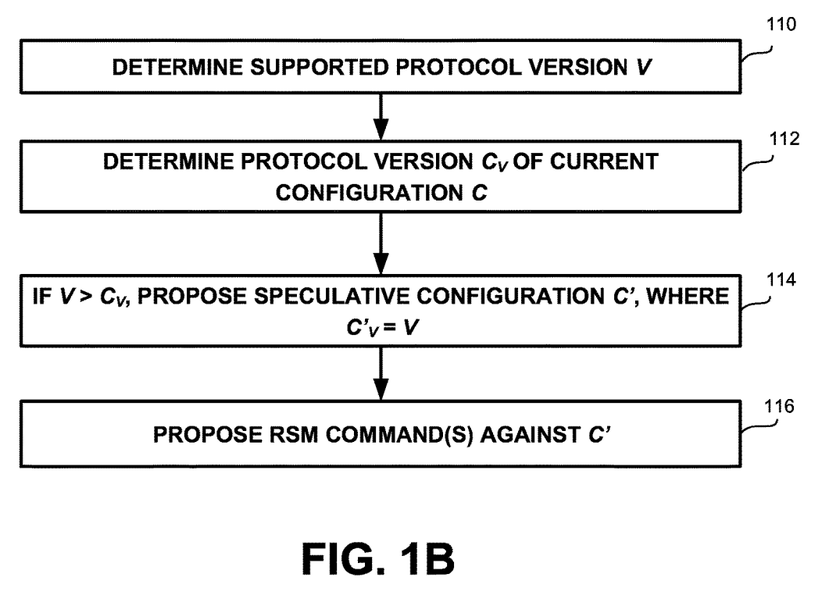
FIG. 1B shows a flowchart diagram of a method for proposing an upgraded protocol version for operating replicated state machine processes, in accordance with some exemplary embodiments of the subject matter.

Referring now to FIG. 1B showing a flowchart diagram of a method for proposing an upgraded protocol version for operating replicated state machine processes, in accordance with some exemplary embodiments of the subject matter.

On Step 110, a protocol version V being supported by a member of the replica-set processes, may be determined. The determination may be made in response to the member process being restarted following an upgrade of the protocol version employed by it, e.g. installation of updated software for running the RSM. The determination may be made after waiting for the process to synchronize its state with the replica-set.

On Step 112, a protocol version $C_V$, employed by the current configuration C of the replica-set, may be determined. The determination of the protocol version $C_V$ may be derived from the current configuration C, which may be determined according to the latest reconfiguration command in the globally ordered log of commands. The determination may be made after waiting for the process to synchronize its state with the replica-set.

On Step 114, a check may be performed whether the protocol version V determined in Step 110 is higher than the currently employed version $C_V$ determined in Step 112, and if so, a speculative configuration C'=(C'$_R$, V), in which the employed protocol version (C'$_V$) is the protocol version V, may be proposed, similarly as in Step 102 of FIG. 1A. In some exemplary embodiments, the replica-set C'$_R$ of the proposed speculative configuration C' may or may not be identical to the replica-set C$_R$ of the current configuration C.

On Step 116, one or more RSM commands may be proposed against the speculative configuration C', in accordance with the protocol version C'$_V$=V. The proposed RSM commands may be tentatively agreed, similarly as in Step 104 of FIG. 1A, and may be committed responsive to the speculative configuration C' being agreed, similarly as in Step 106 of FIG. 1A.

Figure 1C:
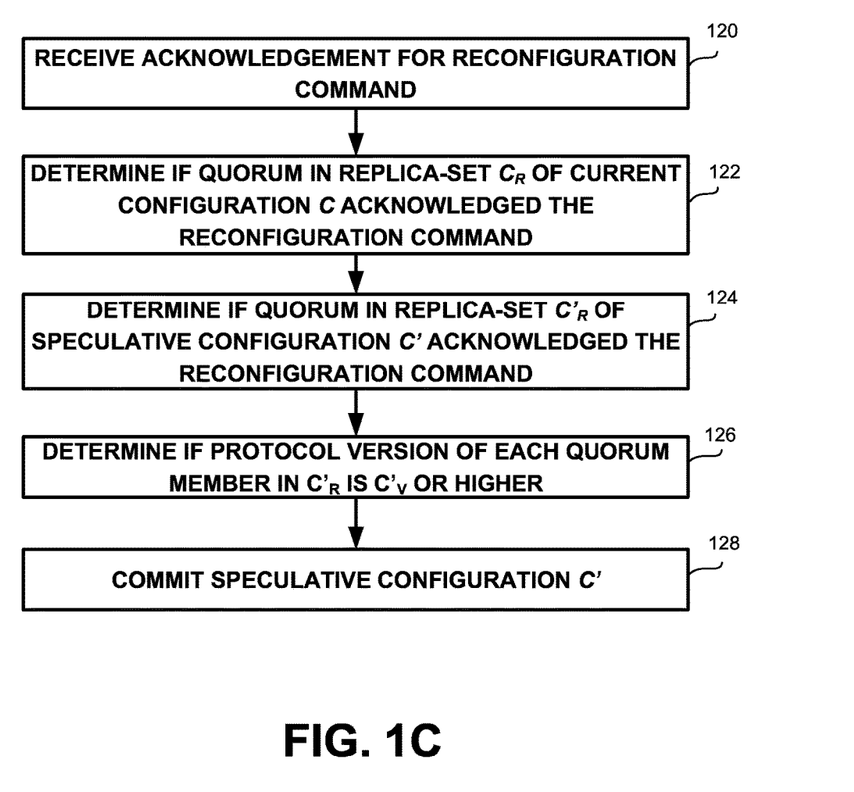
FIG. 1C shows a flowchart diagram of a method for committing an upgraded protocol version for operating replicated state machine processes, in accordance with some exemplary embodiments of the subject matter.

Referring now to FIG. 1C showing a flowchart diagram of a method for committing an upgraded protocol version for operating replicated state machine processes, in accordance with some exemplary embodiments of the subject matter.

On Step 120, an acknowledgement for a reconfiguration command may be received. The reconfiguration command may indicate a modification of a protocol version employed by a plurality of replica-set processes to an updated protocol version. The acknowledgement may be sent by one of the replica-set processes. The acknowledgement may be received by at a leader process of the replica-set under Paxos procedure.

On Step 122, a determination whether a quorum of processes in the replica-set C$_R$ of the current configuration C acknowledged the reconfiguration command may be made. Requirements on the acknowledging processes in order to qualify as quorum may be derived from attributes of C$_R$, such as, for example, the number of constituent processes, protocol version employed, or the like. In some exemplary embodiments, the determination may comprise checking if an acknowledgment was received from at least a predetermined number of processes in C$_R$. The predetermined number may be based on the size of C$_R$.

On Step 124, a determination may be made whether the reconfiguration command was acknowledged by a quorum of processes in the replica-set C'$_R$ of the speculative configuration C proposed by the reconfiguration command. In some exemplary embodiments, in case that C$_R$=C'$_R$, Step 124 may be skipped.

On Step 126, a determination whether each member in the quorum of processes in C'$_R$ that acknowledged the reconfiguration command supports a protocol version at least as high as the protocol version C'$_V$ of the speculative configuration C' proposed by the reconfiguration command, may be made, such as by one or more replicated-set processes (e.g., a process having a designated role in the Paxos-based protocol, such as an acceptor, a learner, or the like). The protocol version supported by a replica-set process may be determined by querying a record of the replica-set versions, similarly as in Step 112 of FIG. 1B. Additionally or alternatively, processes may only acknowledge reconfiguration commands if they support the protocol version of the reconfiguration command. In such an embodiment, Step 126 may be redundant and skipped.

On Step 128, responsive to determinations in Steps 122 to 126 that the conditions specified therein are met, the speculative configuration C' proposed by the reconfiguration command may be committed by one or more replicated-set processes. The committing of C' may comprise committing all speculative RSM commands proposed against C', similarly as in Step 106 of FIG. 1A.

Figure 2:
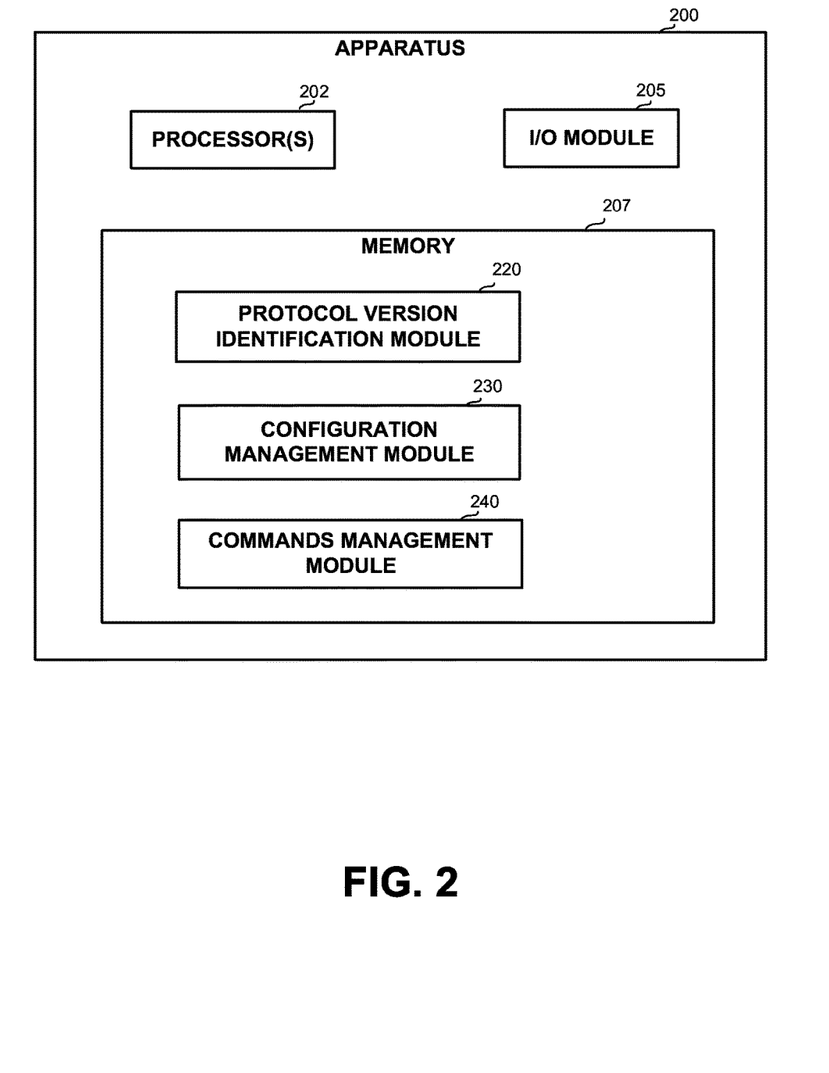
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter.

In some exemplary embodiments, Apparatus 200 may be configured to act as a replicated state machine process in a replica-set in accordance with the disclosed subject matter.

In some exemplary embodiments, Apparatus 200 may comprise one or more Processor(s) 202. The processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) Module 205. I/O Module 205 may be utilized to provide an output to and receive input from a user or another apparatus similar to Apparatus 200.

In some exemplary embodiments, Apparatus 200 may comprise a Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200.

Protocol Version Identification Module 220 may be configured to determine the version of protocol for operating replica-set processes currently being employed by a member of the replica-set. Protocol Version Identification Module 220 may utilize a record of the replica-set versions, such as a local data structure (not shown) retained by Memory 207. Protocol Version Identification Module 220 may be configured to maintain the record and update it in accordance with version messages exchanged between processes.

Configuration Management Module 230 may be configured for keeping track of the current configuration of replica-set processes, as well as any speculative configuration proposed by a reconfiguration command. Configuration Management Module 230 may propose a reconfiguration command for upgrading the protocol version of the replica-set. The reconfiguration command may be proposed by Configuration Management Module 230 in response to a determination by Protocol Version Identification Module 220 that the protocol version of Apparatus 200 exceeds the protocol version of the current configuration. Configuration Management Module 230 may be configured to send and/or receive acknowledgement of a proposed reconfiguration command. Configuration Management Module 230 may be configured for committing a reconfiguration command upon being agreed.

Commands Management Module 240 may be configured for proposing and agreeing or tentatively agreeing on RSM commands. RSM commands may be proposed by Commands Management Module 240 either against the current configuration of replica-set processes or against a speculative configuration proposed or received by Configuration Management Module 230. Commands Management Module 240 may be configured to tentatively agree on commands in accordance with an upgraded protocol version indicated by a reconfiguration command proposed or received by Configuration Management Module 230. Commands Management Module 240 may be configured to commit tentatively agreed commands, responsive to the respective reconfiguration command being agreed by Configuration Management Module 230.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of updating a software version in a replica-set including a plurality of replica-set processes, comprising:
    receiving, by a process belonging to the replica-set, a proposed reconfiguration command, indicating a modification of a protocol software version employed by the plurality of replica-set processes to an updated protocol software version;
    employing the modified protocol software version of the process, responsively to receiving the proposed reconfiguration command;
    receiving at least one proposed command requiring the updated protocol software version, after employing the modified protocol software version;
    replying with acknowledgement messages indicating tentatively agreeing to the received at least one proposed command, prior to receiving an instruction to commit the proposed reconfiguration command;
    responsive to receiving an instruction to commit the proposed reconfiguration command, committing the tentatively agreed at least one proposed command;
    receiving, by the process belonging to the replica-set, proposed reconfiguration commands indicating a change in a quorum required to agree on replicated state machine (RSM) commands; and
    in response to the commands indicating a change in the quorum, handling received RSM commands, based on both a current and proposed quorum, until the change in the quorum is committed or cancelled.

2. The computer-implemented method of claim 1, wherein said tentatively agreeing on the at least one proposed command comprises acknowledgement by at least a predetermined number of replica-set processes.

3. The computer-implemented method of claim 1, wherein the agreeing on the proposed reconfiguration command is based on acknowledgement by at least a predetermined number of replica-set processes.

4. The computer-implemented method of claim 1, wherein said tentatively agreeing on at least one proposed command is Paxos based.

5. The computer-implemented method of claim 1, wherein the agreeing on the proposed reconfiguration command is Paxos based.

6. The computer-implemented method of claim 1, wherein the proposed reconfiguration command further indicates a modification of a current set of replica-set processes to a proposed set of replica-set processes, wherein said agreeing on the reconfiguration command comprises acknowledgement by at least a first predetermined number of members of the proposed set and by at least a second predetermined number of members of the current set.

7. The computer-implemented method of claim 1, wherein employing the modified protocol software version comprises stopping the process, upgrading the software of the process, restarting the process and synchronizing the process with the replica-set.

8. The computer-implemented method of claim 1, comprising acknowledging the modifying of the protocol software version to a process from which the proposed reconfiguration command was received, after employing the modified protocol software version.

9. The computer-implemented method of claim 1, further comprising executing the received at least one proposed command, prior to receiving the instruction to commit the proposed reconfiguration command, wherein the executing is performed in a tentative manner allowing rollback of a state of the process to a state before execution of the at least one proposed command, if the updated protocol software version is not committed.

10. A computerized apparatus having a central processing unit (CPU) processor, the processor being adapted to perform the steps of:
    receiving, by a process running on the processor, wherein the process belongs to a replica-set including a plurality of replica-set processes, a proposed reconfiguration command, indicating a modification of a protocol software version employed by the plurality of replica-set processes to an updated protocol software version;
    employing the modified protocol software version of the process, responsively to receiving the proposed reconfiguration command;
    receiving at least one proposed command requiring the updated protocol software version, after employing the modified protocol software version;
    replying with acknowledgement messages indicating tentatively agreeing to the received at least one proposed command, prior to receiving an instruction to commit the proposed reconfiguration command; and
    responsive to receiving an instruction to commit the proposed reconfiguration command committing the tentatively agreed at least one proposed command,
    wherein the process running on the processor is additionally configured to receive proposed reconfiguration commands indicating a change in a quorum required to agree on replicated state machine (RSM) commands, and in response to the commands indicating a change in the quorum, to handle RSM commands based on both a current and proposed quorum, until the change in the quorum is committed or cancelled.

11. The computerized apparatus of claim 10, wherein the agreeing on the proposed reconfiguration command is based on acknowledgement by at least a predetermined number of replica-set processes.

12. The computerized apparatus of claim 10, wherein said tentatively agreeing on at least one proposed command is Paxos based.

13. The computerized apparatus of claim 10, wherein the agreeing on the proposed reconfiguration command is Paxos based.

14. The computerized apparatus of claim 10, wherein the proposed reconfiguration command further indicates a modification of a current set of replica-set processes to a proposed set of replica-set processes, wherein said agreeing on the reconfiguration command comprises acknowledgement by at least a first predetermined number of members of the proposed set and by at least a second predetermined number of members of the current set.

15. The computerized apparatus of claim 10, wherein employing the modified protocol software version comprises stopping the process, upgrading the software of the process, restarting the process and synchronizing the process with the replica-set.

16. The computerized apparatus of claim 10, comprising acknowledging the modifying of the protocol software version to a process from which the proposed reconfiguration command was received, after employing the modified protocol software version.

17. The computerized apparatus of claim 10, further comprising executing the received at least one proposed command, prior to receiving the instruction to commit the proposed reconfiguration command, wherein the executing is performed in a tentative manner allowing rollback of a state of the process to a state before execution of the at least one proposed command, if the updated protocol software version is not committed.

18. A computer program product comprising a computer readable storage memory retaining program instructions, which program instructions when read by a processor, cause the processor to perform a method comprising:

receiving, by a process running on the processor, wherein the process belongs to a replica-set including a plurality of replica-set processes, a proposed reconfiguration command, indicating a modification of a protocol software version employed by the plurality of replica-set processes to an updated protocol software version;

employing the modified protocol software version of the process, responsively to receiving the proposed reconfiguration command;

receiving at least one proposed command requiring the updated protocol software version, after employing the modified protocol software version;

replying with acknowledgement messages indicating tentatively agreeing to the received at least one proposed command, prior to receiving an instruction to commit the proposed reconfiguration command; and responsive to receiving an instruction to commit the proposed reconfiguration command committing the tentatively agreed at least one proposed command, wherein the program instructions additionally cause the process running on the processor to receive proposed reconfiguration commands indicating a change in a quorum required to agree on replicated state machine (RSM) commands, and in response to the commands indicating a change in the quorum, to handle RSM commands based on both a current and proposed quorum, until the change in the quorum is committed or cancelled.

* * * * *